US010380897B1

(12) United States Patent
Patel et al.

(10) Patent No.: US 10,380,897 B1
(45) Date of Patent: Aug. 13, 2019

(54) VEHICLE SYSTEMS AND METHODS FOR SHARING TARGET VEHICLE VIDEO DURING PASSING EVENTS

(71) Applicant: GM Global Technology Operations LLC, Detroit, MI (US)

(72) Inventors: Shiv G. Patel, Toronto (CA); Akram M. Abdel-Rahman, Ajax (CA); Ephraim C. Yuen, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/935,246

(22) Filed: Mar. 26, 2018

(51) Int. Cl.
*H04N 7/18* (2006.01)
*G08G 1/16* (2006.01)
*B60R 1/00* (2006.01)

(52) U.S. Cl.
CPC .............. *G08G 1/167* (2013.01); *B60R 1/00* (2013.01); *H04N 7/185* (2013.01); *B60R 2300/80* (2013.01)

(58) Field of Classification Search
CPC ........ H04N 7/185; H04N 7/181; G08G 1/167; G08G 1/166; B60R 1/00; B60R 2300/80

USPC ......... 348/115, 116, 119, 148; 340/431, 435, 340/436, 903, 905, 937; 701/400, 25, 93, 701/70, 36, 117
See application file for complete search history.

(56) References Cited

U.S. PATENT DOCUMENTS

2018/0268703 A1\* 9/2018 Kang ................... G08G 1/167

OTHER PUBLICATIONS

U.S. Appl. No. 15/641,906, filed Jul. 5, 2017, Yuen et al.
"The Safety Truck Could Revolutionize Road Safety"; Samsung Newsroom; http://news.samsung.com/global/the-safety-truck-could-revolutionize-road-safety; Jun. 18, 2015; 2 pages.

\* cited by examiner

*Primary Examiner* — Sherrie Hsia (57) ABSTRACT

A vehicle system to assist a driver during a potential passing event of a passing vehicle includes a transceiver and a display. A passing assist module in communication with the transceiver and the display is configured to cause the transceiver to establish a wireless connection with a remote transceiver of a target vehicle and to receive a remote video signal from a camera and the remote transceiver associated with the target vehicle and cause the display of the passing vehicle to output at least one of a video signal and an image based on the remote video signal from the target vehicle.

20 Claims, 5 Drawing Sheets

VEHICLE SYSTEMS AND METHODS FOR SHARING TARGET VEHICLE VIDEO DURING PASSING EVENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods, and more particularly to vehicle systems and methods for sharing target vehicle video during passing events.

When driving on single lane roads, a driver of a vehicle may need to pass a target vehicle located ahead in the same lane. The driver passes the target vehicle by waiting for an opening in oncoming traffic and briefly travelling in an oncoming traffic lane. When travelling on a multi-lane highway, the driver of the vehicle may decide to change lanes to the left or right of the lane including the target vehicle to pass the target vehicle.

In some circumstances, it may be difficult for the driver of the passing vehicle to determine whether or not traffic is sufficiently clear to allow the vehicle to pass. For example, the vehicle may be driving behind a large vehicle such as a semi-trailer truck, a van, a pickup truck, a recreational vehicle, etc. It may be difficult for the driver of the vehicle to pass the vehicle located ahead because the driver may not be able to adequately determine whether or not there is sufficient room to complete the passing maneuver.

SUMMARY

A vehicle system to assist a driver during a potential passing event of a passing vehicle includes a transceiver and a display. A passing assist module in communication with the transceiver and the display is configured to cause the transceiver to establish a wireless connection with a remote transceiver of a target vehicle and to receive a remote video signal from a camera and the remote transceiver associated with the target vehicle and cause the display of the passing vehicle to output at least one of a video signal and an image based on the remote video signal from the target vehicle.

In other features, the passing assist module is further configured to identify a potential passing event. The passing assist module is further configured to identify the potential passing event at least one of in response to driver input and without driver input. The remote video signal comprises a forward looking view from the target vehicle.

In other features, a global positioning system (GPS) is configured to identify a relative lane location and distance between the passing vehicle and the target vehicle and to identify the potential passing event based thereon. The GPS further identifies a local speed limit. The passing assist module is configured to identify the potential passing event further based on a difference between a speed of the target vehicle and the local speed limit. The display comprises at least one of a heads up display (HUD) and a touchscreen.

In other features, the passing assist module automatically stops displaying the at least one of the video signal and the image in response to at least one of the passing vehicle passing the target vehicle and the passing vehicle entering a no-passing zone. At least one of a turn indicator and a pass indicator includes at least one of a button, a touchscreen input and a switch. The passing assist module identifies the potential passing event based on input to the at least one of the turn indicator and the pass indicator.

A method for assisting a driver during a potential passing event of a passing vehicle includes causing a transceiver associated with the passing vehicle to establish a wireless connection with a remote transceiver of a target vehicle; receiving a video signal from a camera and the remote transceiver associated with the target vehicle; and causing a display of the passing vehicle to output at least one of a video signal and an image based on the video signal from the target vehicle.

In other features, the method includes identifying a potential passing event at least one of in response to driver input and without driver input. The method includes identifying a relative lane location and distance between the passing vehicle and the target vehicle using a global positioning system (GPS) and a map. The method includes identifying the potential passing event based on the relative lane location and the distance.

In other features, the method includes identifying a local speed limit using the GPS and the map; and identifying the potential passing event based on a difference between a speed of the target vehicle and the local speed limit.

In other features, the display comprises at least one of a heads up display (HUD) and a touchscreen. The method includes stopping displaying the at least one of the video signal and the image in response to at least one of the passing vehicle passing the target vehicle and the passing vehicle entering a no-passing zone.

In other features, the method includes identifying the potential passing event based on input to the at least one of a turn indicator and a pass indicator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As used herein, the term passing vehicle refers to the vehicle attempting to pass a target vehicle. The target vehicle is located in front of the passing vehicle on a roadway. The term target vehicle refers to the vehicle that may be passed by the passing vehicle.

According to the present disclosure, the passing vehicle receives video signals from the target vehicle under certain circumstances to help the driver of the passing vehicle make the decision to pass the target vehicle. In some examples, the passing vehicle and the target vehicle establish a data link to allow transfer of video and/or other data (such as GPS coordinates, speed, lane location, heading, etc.) using a transceiver such as a vehicle-to-vehicle (V2V) transceiver or a peer-to-peer transceiver that operate (in a manner similar to a WiFi or Bluetooth transceivers over greater distances). In some examples, both the passing vehicle and the target vehicle have enabled sharing of vehicle video and/or GPS data under certain circumstances.

When the passing vehicle is located behind the target vehicle (and, in some examples, the driver of the passing vehicle further indicates the intent to pass the target vehicle), the video signals and/or GPS data from the target vehicle are transmitted to the passing vehicle, processed by the passing vehicle (if needed) and displayed on a display of an infotainment system or used to generate an output image to a heads up display (HUD) of the passing vehicle.

Alternately, the video and/or GPS data can automatically be transmitted to the target vehicle when the passing vehicle is located within a predetermined zone (such as the same lane) or predetermined distance in the same direction immediately behind the target vehicle. In some examples, GPS maps and GPS data are used to determine when the passing vehicle is located within the predetermined zone or distance. In some examples, the decision may be based on relative lane location and distance between the passing vehicle and the target vehicle. In some examples, the vehicle system does not output the video signal in regions where passing is prohibited (as determined by the location of the passing vehicle on the GPS maps). The video signals from the target vehicle allow the driver of the passing vehicle to see beyond the target vehicle and/or to make a more informed passing decision as will be described below.

Figure 1:
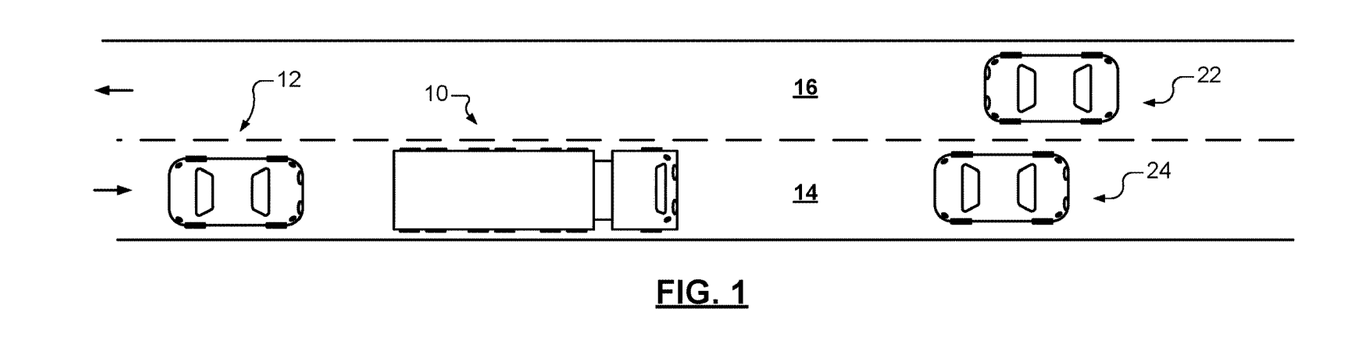
FIG. 1 illustrates an example of vehicles traveling on a single lane road.
Figure 2:
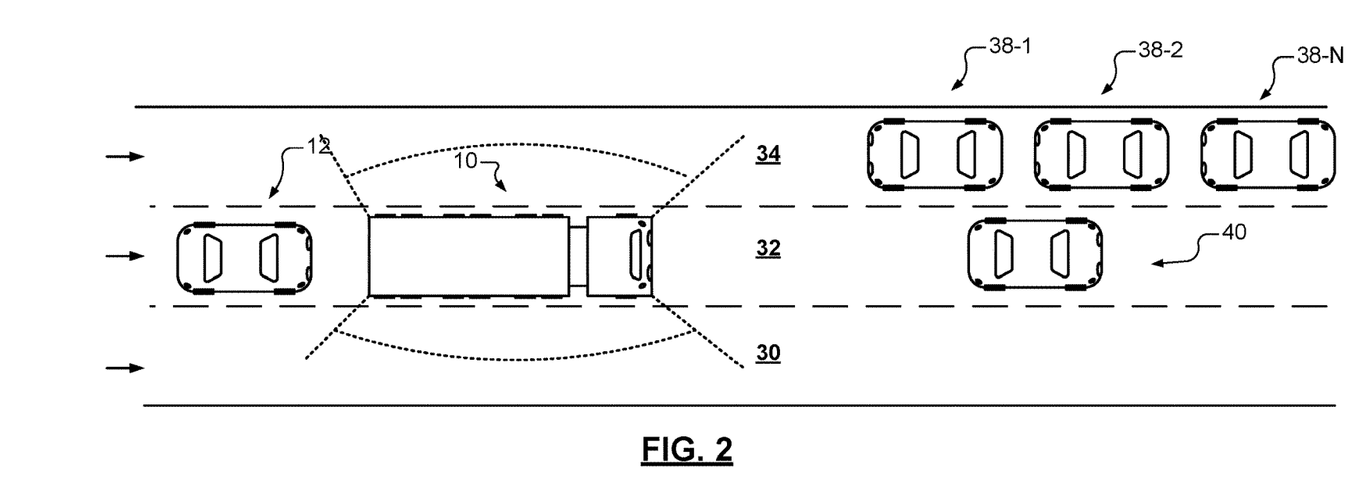
FIG. 2 illustrates an example of vehicles traveling on a multi-lane highway.

Referring now to FIGS. 1-2, examples of situations where passing may occur are shown. In FIG. 1, a target vehicle 10 (such as a semi-trailer truck) and a passing vehicle 12 (such as a passenger vehicle) are shown traveling on a single lane road. The single lane road includes a first lane 14 for traffic traveling in a first direction and a second lane 16 for traffic traveling in a second direction that is opposite the first direction.

As the passing vehicle 12 approaches a slower-moving target vehicle 10 from behind, the driver of the passing vehicle 12 may consider passing the target vehicle 10. However, due to the relative size differences and the viewing angle that is involved, it may be difficult for the driver of the passing vehicle 12 to see beyond the target vehicle 10. Therefore, it is difficult for the driver of the passing vehicle 12 to determine whether or not to initiate the passing event. While the target vehicle 10 is shown as a semi-trailer truck in FIG. 1, other vehicles such as pickup trucks, vans, passenger vehicles and the like may pose similar problems. While the passing vehicle 12 is shown as a passenger vehicle in FIG. 1, the passing vehicle may also be another type of vehicle such as pickup trucks, vans, semi-trailers and the like.

In the example in FIG. 1, the driver of the passing vehicle 12 may be unable to see either a vehicle 22 located in the oncoming or second lane 16 or a vehicle 24 located in the same or first lane 14 in which the passing vehicle 12 is currently traveling. The vehicle 24 may prevent the passing vehicle 12 from re-entering the first lane 14 after passing the target vehicle 10. Alternately, the passing vehicle 12 may also cause an accident with the vehicle 22 travelling in the opposite direction.

In FIG. 2, vehicles such as the target vehicle 10 and the passing vehicle 12 are shown traveling on a multi-lane highway. In this example, the multi-lane highway includes lanes 30, 32 and 34 that include traffic moving in the same direction. The target vehicle 10 and the passing vehicle 12 are shown traveling in the center lane 32. Vehicles 38-1, 38-2, . . . 38-N (collectively vehicles 38) (where N is an integer greater than one) are traveling in the lane 34 located to the left of the lane 32. There are no vehicles in the lane 30 to the right of the lane 32.

As can be appreciated, it is difficult for the driver of the passing vehicle 12 to determine which lane to select for passing because the target vehicle 10 is blocking the driver's view. While it may be normal for drivers to pass on the left of a slower moving target vehicle, it may be desirable to attempt to pass to the right of the slower moving target vehicle (as shown in this example). Using the video signals from the target vehicle, the passing vehicle can make the correct decision.

Figure 3:
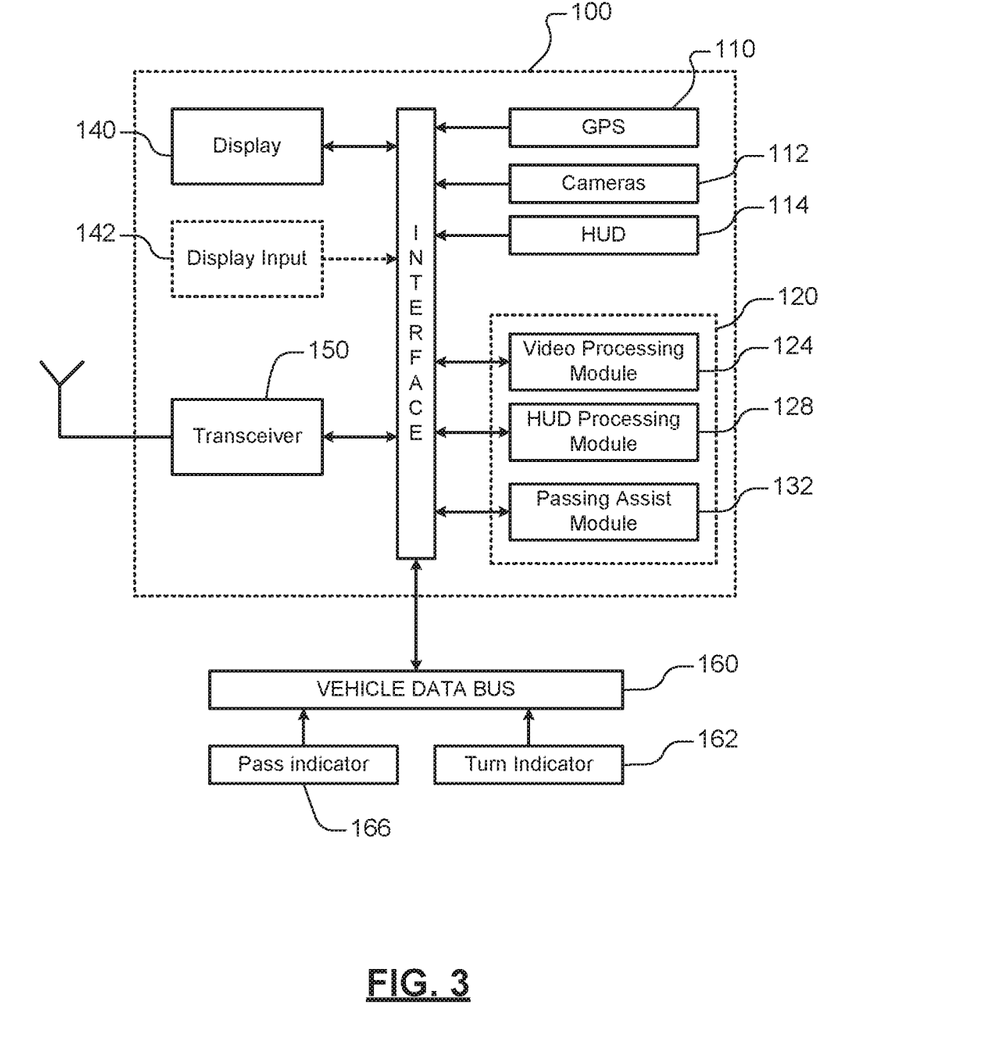
FIG. 3 is a functional block diagram of an example of a vehicle system in a passing vehicle for sharing target vehicle video during passing events according to the present disclosure.

Referring now to FIG. 3, a vehicle system 100 associated with the passing vehicle is shown. The vehicle system 100 includes a global positioning system (GPS) 110 to provide GPS data. In some examples, the GPS system 110 uses high definition (HD) maps that allow location of vehicles relative to lanes of roads.

One or more cameras 112 may be located around a periphery of the passing vehicle. For example, the passing vehicle may include front facing, rear facing and side facing cameras. Normally, these cameras are used during parking and reversing operations. In some examples, the vehicle system 100 includes a heads up display 114 that projects images onto a windshield of the vehicle. The vehicle system 100 further includes one or more of a video processing module 124 and heads up display (HUD) processing module 128. The HUD processing module 128 generates images including GPS-based map images and/or directions, vehicle operating data, and/or images such as augmented reality (AR) images for display.

The vehicle system 100 further includes a passing assist module 132. The passing assist module 132 manages acquisition, processing and/or output of video signals from the target vehicle or HUD images based on the video signals from the target vehicle under certain circumstances as will be described below. In some examples, the passing assist module 132 receives GPS data from the target vehicle and determines relative lane positions, following distances, following distance change rates, differences between the local speed limit and the speed of travel of the passing and/or target vehicles, etc.

The video processing module 124 communicates with the cameras 112 and generates video signals that are output to a display 140. In some examples, the display includes a display without touchscreen capability or a touchscreen. In some examples, the video processing module 124 generates a single video signal based on video signals from more than one camera (e.g. from one or more of the cameras 112 and/or from video signals generated by cameras associated with the target vehicle). In various examples, the display 140 includes a touchscreen as an input device, the display 140 is associated with other display inputs 142 such as buttons, knobs and the like, or both touchscreen and button inputs are used.

The vehicle system 100 further includes a transceiver 150 that includes a physical layer device (that interfaces with the wireless medium and that handles data transmission and reception) and a medium access control device (that performs higher level functions and provides an external interface to a host). The transceiver 150 is capable of establishing a communication link with other vehicles within a predetermined distance of the host vehicle and transferring data between the host vehicle and linked vehicles. In some examples, the transceiver 150 includes a vehicle to vehicle (V2V) transceiver, a peer-to-peer transceiver, or any other suitable transceiver that operates in an ad-hoc manner similar to a WiFi system. In other examples, transceivers associated with cellular or satellite communication systems are used. In some examples, the predetermined distance is less than 300 meters, although other distances may be used. In some examples, the transceiver 150 is also capable of joining a mesh network that allows communication with vehicles located at greater distances from the vehicle by linking together multiple vehicles.

The vehicle system 100 may communicate with a vehicle data bus 160 such as a communication area network (CAN) bus to allow transfer of data between the vehicle and the vehicle system 100. In some examples, the vehicle may include a turn indicator 162. In some examples, the turn indicator 162 may be used to indicate the driver's intent to pass the target vehicle. In other examples, the vehicle may be equipped with an additional input device to allow the driver to indicate intent to pass a vehicle (a pass indicator 166). In some examples, the pass indicator may be located on the same input device as the turn signal or another device can be used. Alternately, the intent to pass may be inferred from the situation.

Figure 4:
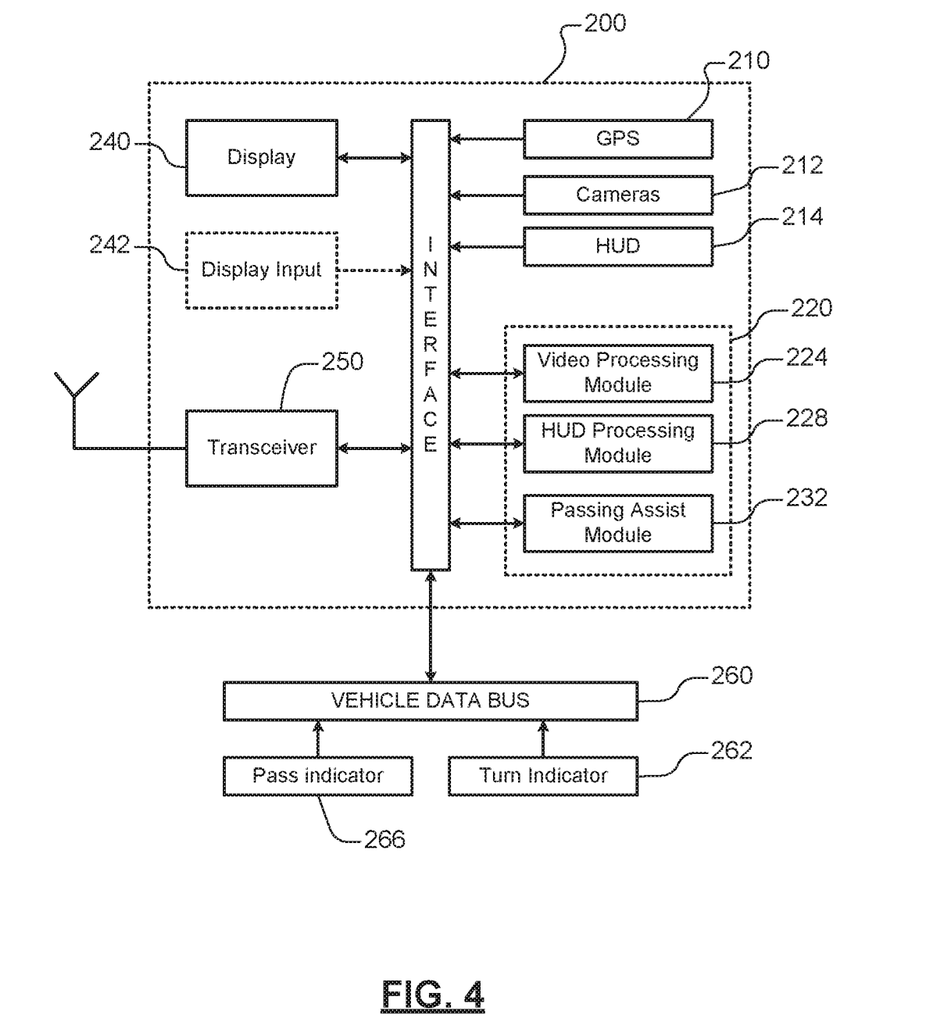
FIG. 4 is a functional block diagram of an example of a vehicle system in a target vehicle for sharing target vehicle video during passing events according to the present disclosure.

Referring now to FIGS. 2 and 4, an example of a target vehicle is shown. In FIG. 2, the target vehicle may include a camera with a front field of view (FOV). The target vehicle may include side cameras with side FOVs. The video signal sent to the passing vehicle may include the front FOV or a combination of the front FOV and side FOV.

In FIG. 4, the target vehicle includes a similar system as the passing vehicle. However, the target vehicle can include a pared down system to reduce cost. For example, the target vehicle may include cameras, a transceiver and a passing assist module to coordinate transferring the video signals.

In the example in FIG. 4, the target vehicle includes a vehicle system 200. The vehicle system 200 includes a global positioning system (GPS) 210 to provide GPS data. One or more cameras 212 may be located around a periphery of the vehicle. For example, front facing, rear facing and side facing cameras may be used. In some examples, the vehicle includes a HUD 214.

The vehicle system 200 further includes a video processing module 224 and/or a HUD processing module 228. The vehicle system 100 further includes a passing assist module 232. The passing assist module 232 forwards video from the target vehicle to the potential passing vehicle under certain circumstances as will be described below.

The video processing module 224 communicates with the cameras 212 and generates video that is output to a display 240 and/or to the passing vehicle in some circumstances. In some examples, the video processing module 224 generates a single video signal from a composite or combination of more than one camera (e.g. from one or more of the cameras 212 and/or from cameras associated with a target vehicle (when the vehicle is attempting to pass a target vehicle)). In some examples, the display 240 includes a touchscreen as an input device, the display 240 is associated with other display inputs 242 such as buttons, knobs and the like, or a combination of touchscreen and buttons is used.

The vehicle system 200 further includes a vehicle to vehicle (V2V) transceiver 250. The vehicle system 200 may communicate with a vehicle data bus 260 such as a communication area network (CAN) bus to allow transfer of data between the vehicle and the vehicle system 200. In some examples, the vehicle may include a turn indicator 262. In other examples, the vehicle may be equipped with an additional input such as a button or switch to allow the driver to indicate intent to pass a vehicle (such as a pass indicator 266).

Figure 5:
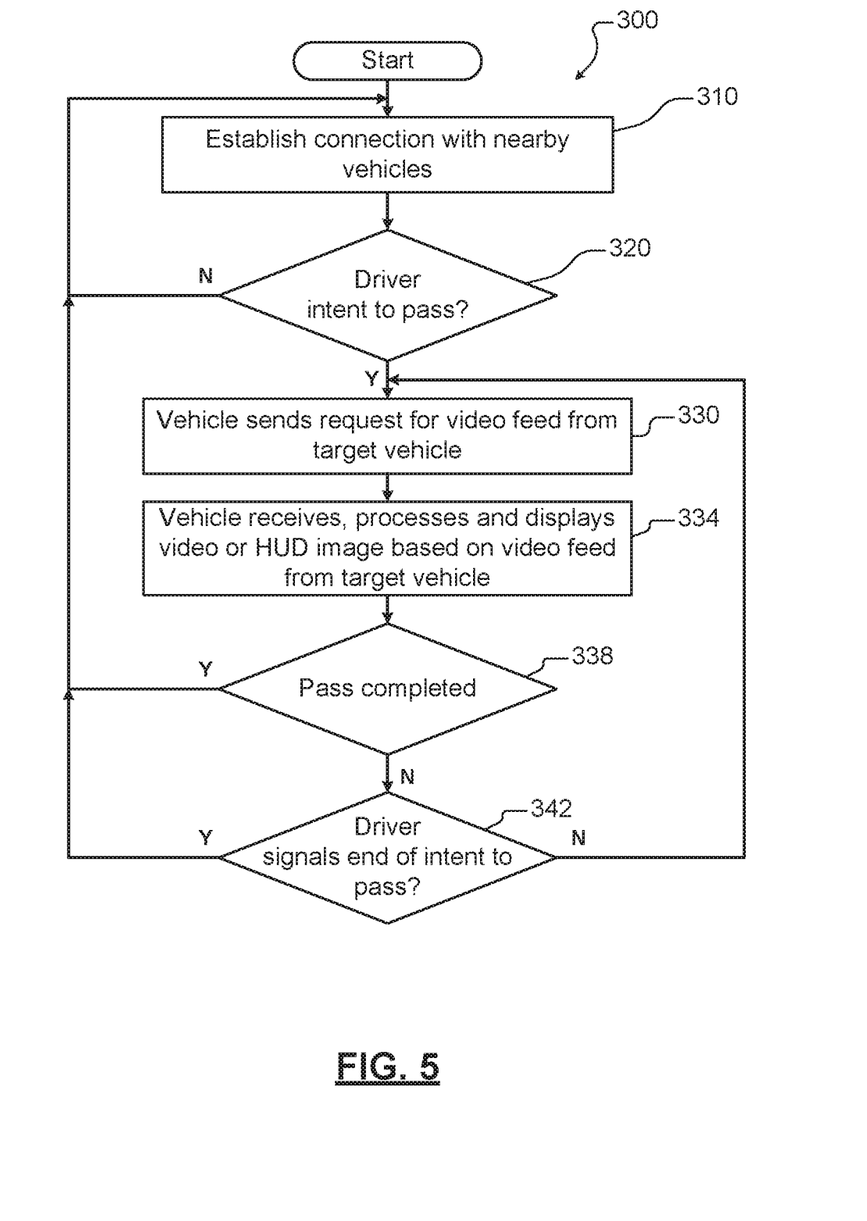
FIG. 5 is a flowchart illustrating an example of a method for sharing target vehicle video during passing events according to the present disclosure.

Referring now to FIG. 5, a method 300 for sharing target vehicle video during passing events is shown. At 310, a connection is established with nearby vehicles using the transceivers. At 320, the passing assist module determines whether any vehicles are potentially target vehicles to be passed and whether the driver of the passing vehicle has demonstrated intent to pass the target vehicle. In some examples, driver intent may be specifically triggered by the driver of the passing vehicle (for example, using the turn indicator or the pass indicator). Alternately, driver intent may be inferred from the circumstances (such as when the difference between a speed of the target vehicle and a posted speed limit is greater than a predetermined value). If 320 is false, the method returns to 310

If 320 is true, the passing vehicle sends a request to the target vehicle for video data. At 334, the passing vehicle receives, processes and displays a video signal or HUD image based on the video signals from the target vehicle. For example, if the target vehicle sends video signals from one or more cameras, the passing vehicle may use the video signal as is or may perform video processing and generate a composite video based thereon for local display. For example, if the target vehicle sends video signals, the passing vehicle may process the video signals to generate an augmented reality (AR) image output to either the HUD or the display of the passing vehicle. In some examples, the AR image removes the target vehicle from the image, provides an image from a 3D tilted perspective, or toggles between images with and without the target vehicle.

At 338, the method determines whether the pass has been completed. For example, the method may determine that the pass is completed when the passing vehicle is ahead of the target vehicle in the direction of travel. If 338 is true, the method returns to 310. Otherwise, the method continues at 342 and determines whether the driver has signaled an end of the intent to pass. For example, the driver may signal an end of the intent to pass by turning off the turn signal (or the pass indicator). In other examples the end of the intent to pass may be inferred from other data such as the speed difference between the target vehicle and the posted speed limit falling below the predetermined value. If 342 is true, the method returns to 310. Otherwise the method returns to 330.

Figure 6:
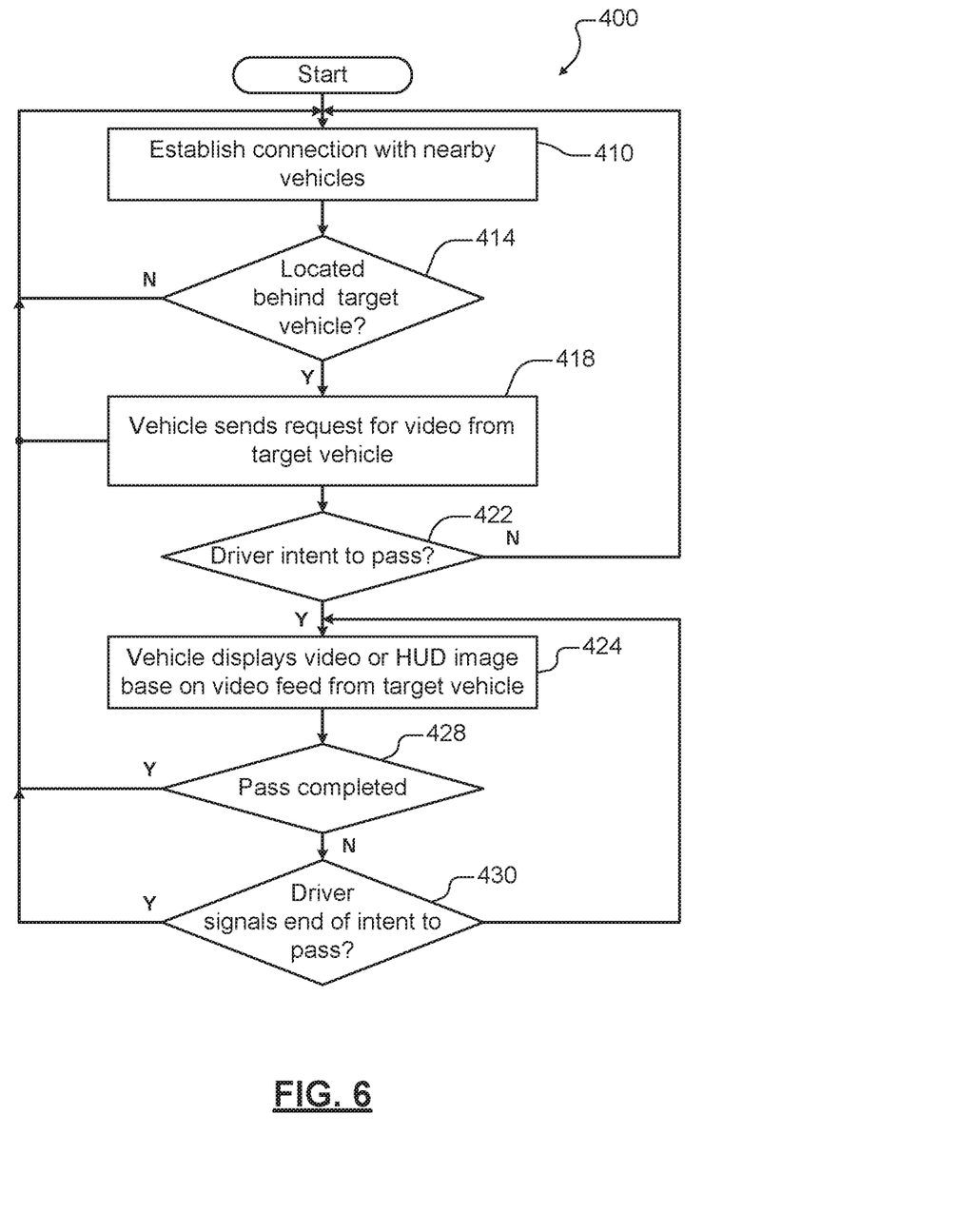
FIG. 6 is a flowchart illustrating an example of another method for sharing target vehicle video during passing events according to the present disclosure.

Referring now to FIG. 6, another method for sharing target vehicle video during passing events is shown. In this method, the passing vehicle automatically requests the video signals from the target vehicle when the passing vehicle is located in the same lane within a predetermined distance behind the target vehicle (independent of intent to pass) to reduce latency.

At 410, a connection is established with nearby vehicles using the transceivers. At 420, the passing assist module determines whether a target vehicle is within a predetermined distance in front of the passing vehicle. If 414 is false, the method continues at 410. If 414 is true, the method continues at 418. At 418, the passing vehicle sends a request for the video signal feed from the target vehicle. At 422, if the driver demonstrates intent to pass the target vehicle at 422, the passing vehicle displays the video signal or HUD image (based at least in part on the video signals from the target vehicle).

At 428, the method determines whether the pass was completed. If 428 is true, the method returns to 410. If 428 is false, the method continues at 430 and determines whether the driver has signaled an end of the intent to pass.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle system to assist a driver during a potential passing event of a passing vehicle, comprising:
   a transceiver;
   a display; and
   a passing assist module in communication with the transceiver and the display and configured to:
      cause the transceiver to establish a wireless connection with a remote transceiver of a target vehicle and to receive a remote video signal from a camera and the remote transceiver associated with the target vehicle; and
      cause the display of the passing vehicle to output at least one of a video signal and an image based on the remote video signal from the target vehicle.

2. The vehicle system of claim 1, wherein the passing assist module is further configured to identify a potential passing event.

3. The vehicle system of claim 1, wherein the passing assist module is further configured to identify the potential passing event at least one of in response to driver input and without driver input.

4. The vehicle system of claim 1, wherein the remote video signal comprises a forward looking view from the target vehicle.

5. The vehicle system of claim 1, further comprising a global positioning system (GPS) configured to identify a relative lane location and distance between the passing vehicle and the target vehicle and to identify the potential passing event based thereon.

6. The vehicle system of claim 5, wherein the GPS further identifies a local speed limit.

7. The vehicle system of claim 6, wherein the passing assist module is configured to identify the potential passing event further based on a difference between a speed of the target vehicle and the local speed limit.

8. The vehicle system of claim 1, wherein the display comprises at least one of a heads up display (HUD) and a touchscreen.

9. The vehicle system of claim 1, wherein the passing assist module automatically stops displaying the at least one of the video signal and the image in response to at least one of the passing vehicle passing the target vehicle and the passing vehicle entering a no-passing zone.

10. The vehicle system of claim 1, further comprising:
    at least one of a turn indicator and a pass indicator including at least one of a button, a touchscreen input and a switch,
    wherein the passing assist module identifies the potential passing event based on input to the at least one of the turn indicator and the pass indicator.

11. A method for assisting a driver during a potential passing event of a passing vehicle, comprising:
    causing a transceiver associated with the passing vehicle to establish a wireless connection with a remote transceiver of a target vehicle;
    receiving a video signal from a camera and the remote transceiver associated with the target vehicle; and
    causing a display of the passing vehicle to output at least one of a video signal and an image based on the video signal from the target vehicle.

12. The method of claim 11, further comprising identifying a potential passing event at least one of in response to driver input and without driver input.

13. The method of claim 11, further comprising:
    identifying a relative lane location and distance between the passing vehicle and the target vehicle using a global positioning system (GPS) and a map; and
    identifying the potential passing event based on the relative lane location and the distance.

14. The method of claim 13, further comprising:
    identifying a local speed limit using the GPS and the map; and
    identifying the potential passing event based on a difference between a speed of the target vehicle and the local speed limit.

15. The method of claim 11, wherein the display comprises at least one of a heads up display (HUD) and a touchscreen.

16. The method of claim 11, further comprising stopping displaying the at least one of the video signal and the image in response to at least one of the passing vehicle passing the target vehicle and the passing vehicle entering a no-passing zone.

17. The method of claim 11, further comprising identifying the potential passing event based on input to the at least one of a turn indicator and a pass indicator.

18. A vehicle system to assist a driver during a passing event of a passing vehicle, comprising:
    a transceiver;
    a global positioning system (GPS) configured to identify a relative lane location and distance between the passing vehicle and a target vehicle;
    a display; and
    a passing assist module in communication with the transceiver and configured to:
       identify a potential passing event at least one of in response to driver input and based on the relative lane location and the distance determined by the GPS;
       cause the transceiver to establish a wireless connection with a remote transceiver of the target vehicle and to receive a remote video signal from a camera and the remote transceiver associated with the target vehicle, wherein the remote video signal comprises a forward looking view from the target vehicle; and
       cause the display of the passing vehicle to output at least one of a video signal and an image based on the remote video signal from the target vehicle.

19. The vehicle system of claim 18, wherein the GPS further identifies a local speed limit, and wherein the passing assist module is configured to identify the potential passing event further based on a difference between a speed of the target vehicle and the local speed limit.

20. The vehicle system of claim 18, wherein the passing assist module automatically stops displaying the at least one of the video signal and the image in response to at least one of the passing vehicle passing the target vehicle and the passing vehicle entering a no-passing zone.

\* \* \* \* \*